(12) United States Patent
Collins

(10) Patent No.: US 6,826,497 B1
(45) Date of Patent: Nov. 30, 2004

(54) METHOD FOR MONITORING PRODUCTION AND QUALITY

(75) Inventor: Dave Roy Collins, Canton, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 09/552,387

(22) Filed: Apr. 19, 2000

(51) Int. Cl.[7] .............................................. G06F 15/46
(52) U.S. Cl. ...................................................... 702/81
(58) Field of Search .............................. 702/81, 20, 35, 702/82; 356/237, 430, 613; 257/48; 382/141, 149, 108; 700/109, 110, 95, 121; 250/559; 707/2, 3; 324/751; 709/230, 247; 209/44; 706/47; 73/600, 634; 156/282, 498

(56) References Cited

U.S. PATENT DOCUMENTS

| | | | | |
|---|---|---|---|---|
| 4,629,319 A | * | 12/1986 | Clarke et al. ............. 356/237.2 |
| 4,853,879 A | * | 8/1989 | Matzoll, Jr. et al. .......... 702/82 |
| 4,863,268 A | * | 9/1989 | Clarke et al. ............. 356/237.2 |
| 5,142,648 A | * | 8/1992 | Fitts et al. ................... 382/108 |
| 5,341,304 A | * | 8/1994 | Sakamoto et al. .......... 700/110 |
| 5,636,024 A | * | 6/1997 | Crookham et al. .......... 356/613 |
| 5,841,530 A | * | 11/1998 | Hewitt et al. ............. 356/237.1 |
| 5,940,300 A | * | 8/1999 | Ozaki .......................... 700/121 |
| 5,959,211 A | * | 9/1999 | Wagner et al. ................ 73/634 |
| 6,033,517 A | * | 3/2000 | Chenetski .................... 156/282 |
| 6,055,860 A | * | 5/2000 | Pfanstiehl ..................... 73/600 |
| 6,092,060 A | * | 7/2000 | Guinta et al. ................. 706/47 |
| 6,125,400 A | * | 9/2000 | Cohen et al. ................ 709/247 |
| 6,147,752 A | * | 11/2000 | Hewitt et al. ............. 356/237.1 |
| 6,240,328 B1 | * | 5/2001 | LaLonde et al. .............. 700/95 |
| 6,257,297 B1 | * | 7/2001 | Chenetski ................... 156/498 |
| 6,278,517 B1 | * | 8/2001 | Willing .................... 356/237.2 |

* cited by examiner

Primary Examiner—John Barlow
Assistant Examiner—Tung Lau
(74) Attorney, Agent, or Firm—David B. Kelley

(57) ABSTRACT

A method for monitoring assembly plant production and quality, particularly relative to painting processes for vehicles. The method includes painting a plurality of vehicles, inspecting each vehicle for paint defects, and recording production quantity data and processing defect data for vehicles using a touch screen. The touch screen includes a computer-generated template of multiple views the vehicle, such that, the location of each paint defect can be recorded. The data is accessible through a network connection and is used to determine required production time and corrective actions for paint defect trends.

12 Claims, 1 Drawing Sheet

METHOD FOR MONITORING PRODUCTION AND QUALITY

TECHNICAL FIELD

The present invention relates generally to assembly processes and, more particularly, to a method for monitoring assembly plant production and quality.

BACKGROUND ART

In order to remain successful, any industry that produces consumer goods must constantly monitor production and improve the quality of their products. If the availability or quality of a product is lower than customer expectations, then the customer will find alternative producers of a similar, better quality product. Therefore, it is in the best interest of producers of consumer goods to monitor production while constantly striving to improve the quality of their products.

In the past, assembly plant production and quality was tracked manually. This resulted in not everyone having access to the data. Additionally, many production operations require the use of gloves, which makes the use of a pencil and paper very difficult. Also, many operations do not allow time for manually tracking production quantity and quality.

One example of this is the painting process in an assembly plant. Because of the sensitivity of the painting process to defects caused by contaminants, the operators are required to wear protective clothing, including gloves. Obviously, this makes manually tracking production quantity and quality difficult. Additionally, the presence of manual record keeping materials introduces contaminants into the painting process. This can result in an increase in repairs and the associated waste of solvent and paint to correct the defects. The increase of repairs results in higher costs and can have an impact on the emission of volatile organic compounds (VOC's) to the environment. Also, the manual process for tracking production quantity and quality is not easily accessible to all concerned individuals.

The disadvantages associated with conventional methods for tracking production quantity and quality have made it apparent that a new technique for monitoring assembly plant production and quality is needed. The new technique should be able to track production quantity and quality without requiring manual tracking procedures. Additionally, the production quantity and quality data should be easily accessible to all concerned individuals.

SUMMARY OF THE INVENTION

It is an object of the invention to provide an improved and reliable means for monitoring assembly plant production and quality, particularly in the painting process for consumer products. Another object of the invention is to track production quantity and quality without requiring manual tracking procedures.

In accordance with the objects of this invention, a method for monitoring assembly plant production and quality is provided. In one aspect of the invention, a method for monitoring assembly plant production and quality, particularly relative to painting processes for vehicles, includes painting a plurality of vehicles, inspecting each vehicle for paint defects, and recording production quantity data and processing defect data for vehicles using a touch screen. The touch screen includes a computer-generated template of multiple views the vehicle, such that, the location of each paint defect can be recorded. The data is accessible through a network connection and is used to determine required production time and corrective actions for paint defect trends.

The present invention achieves an improved and reliable means for monitoring assembly plant production and quality. Also, the present invention is advantageous in that it makes production quantity and quality data easily accessible to all concerned individuals.

Additional advantages and features of the present invention will become apparent from the description that follows, and may be realized by means of the instrumentalities and combinations particularly pointed out in the appended claims, taken in conjunction with the accompanying drawings.

BRIEF DESCRIPTION OF THE DRAWINGS

In order that the invention may be well understood, there will now be described some embodiments thereof, given by way of example, reference being made to the accompanying drawings, in which.

BEST NODE(S) FOR CARRYING OUT THE INVENTION

Figure 1:
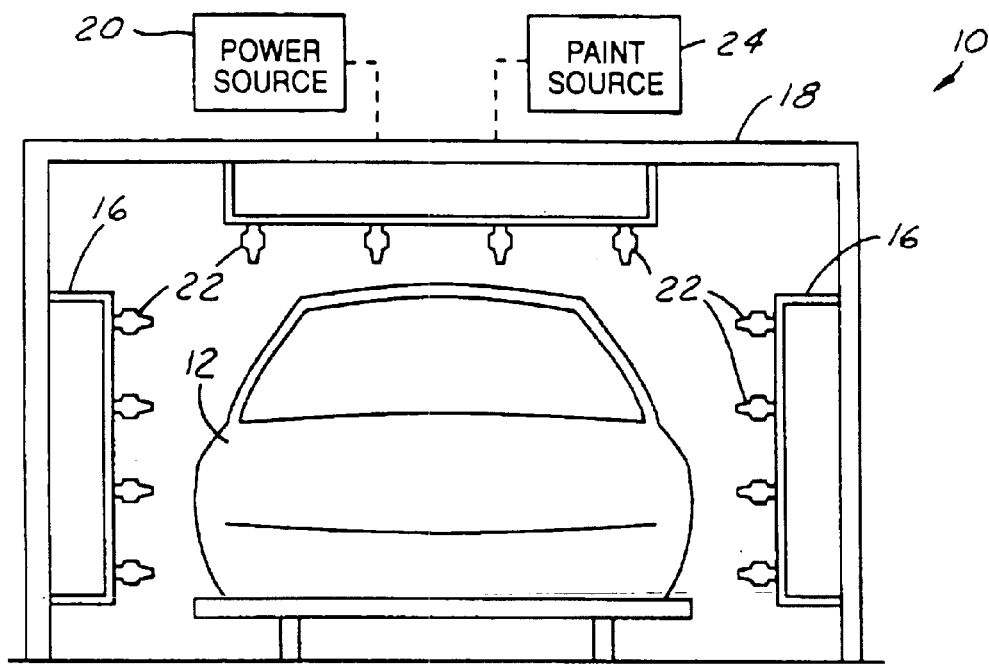
FIG. 1 is a depiction of a paint spray system according to one embodiment of the present invention.

In the following figures, the same reference numerals will be used to identify identical components in the various views. The present invention is illustrated with respect to a painting process particularly suited for the automotive field. However, the present invention is applicable to various other uses that may require monitoring assembly plant production and quality.

Referring to FIG. 1, a paint spray system 10 according to one embodiment of the present invention is illustrated. System 10 includes a plurality of robotic arms that may include an overhead arm 14 and side arms 16. Each arm 14, 16 is coupled to a rack 18. In such systems, arms 14, 16 move according to XYZ coordinates with respect to rack 18. Commonly, the XYZ coordinates of arms 14, 16 vary depending upon the part 12 to be painted. It is common, for example, to maintain a predetermined distance from the surface to be painted. Each arm 14, 16 has a plurality of motors (not shown) that permit movement of the arms 14, 16 into desired positions with respect to part 12. A power source 20 is coupled to paint spray system 10 to power arms 14, 16. Each arm 14, 16 has a paint atomizer head 22 positioned thereon. As will be further described below, each paint atomizer head 22 generates a desired paint spray with respect to part 12. Each paint atomizer head 22 is fluidically coupled to a paint source 24 that supplies paint thereto.

Each time a new color of paint is required, the current color paint present in paint atomizer head 22 needs to be purged. The process of changing paint colors requires several steps. First, paint source 24 is decoupled from paint head 22 and the paint drained. Next, paint head 22 is coupled to a paint solvent and is flushed with the paint solvent until all paint is removed. The paint solvent is then decoupled from paint head 22 and the solvent is drained. Finally, the new paint source 24 is coupled to paint head 22 and paint head 22 is activated until all paint solvent is removed.

Figure 2:
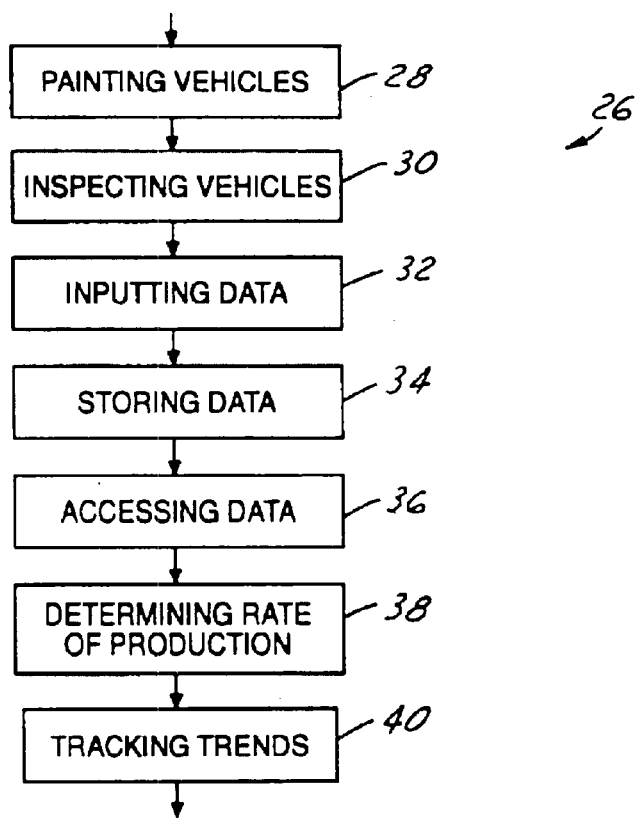
FIG. 2 is a block diagram of a method for monitoring assembly plant production and quality according to one embodiment of the present invention.

Referring to FIG. 2, a block diagram of a method 26 for monitoring assembly plant production and quality according to one embodiment of the present invention is illustrated. Method 26 begins with step 28 by processing a plurality of consumer products. One example of this would be painting a plurality of vehicles (such as trucks). In step 30, once these consumer products are processed, each consumer product is inspected for processing defects. In the present invention, after each vehicle is painted it is inspected for any paint defects.

The sequence then proceeds to step 32 where production quantity data and processing defect data is recorded. Production quantity data is recorded to calculate the number of products being produced every hour. In this way, the amount of production time required to meet customer orders can be determined. Processing defect data is also recorded. The identification number for each consumer product is recorded with the location of each processing defect. This is done to track any trends in processing defects.

The above data is recorded using a computer terminal that is coupled to a network, such as an Internet or Intranet connection. In one aspect of the invention, the data is recorded using a touch screen. The touch screen is comprised of a computer-generated template of multiple views of the vehicle. An operator records all paint defects for a given vehicle by touching the location on the touch screen corresponding to the defective area on the vehicle. The use of a touch screen allows the operator to record production quantity and quality without resorting to manual record keeping. This is especially critical in a paint shop where operators are required to wear protective clothing (including gloves) and the introduction of contaminants is undesirable. In step 34, the data is stored in a database also coupled to the network.

The sequence then proceeds to step 36. Because the database is coupled to a network, any concerned individual may access the data located in the database through an auxiliary computer. In the present invention, the data may be displayed in number of different ways. One example uses a computer-generated template of multiple views of either an individual vehicle or the total number of defects for all vehicles. This data may be sorted by number of vehicles produced or by time period. In step 38, the data is used to determine the production rate or the total number of vehicles produced. The rate or total number of vehicles produced is used to determine the production time required to meet customer requirements. In step 40, processing defect data is tracked and analyzed for trends. As trends begin to occur, corrective actions are implemented to eliminate these trends. In this way, recurring paint defects can be prevented before then have a major impact on quality.

The method and system of the present invention allows monitoring of assembly plant production and quality without requiring the use of manual procedures. Additionally, the invention allows production quantity and quality data to be easily accessible to all concerned individuals.

From the foregoing, it can be seen that there has been brought to the art a new and improved method for monitoring assembly plant production and quality. It is to be understood that the preceding description of the preferred embodiment is merely illustrative of some of the many specific embodiments that represent applications of the principles of the present invention. Clearly, numerous and other arrangements would be evident to those skilled in the art without departing from the scope of the invention as defined by the following claims.

What is claimed is:

1. A method for monitoring assembly plant production quantity and quality of a consumer product comprising the steps of:

processing a plurality of consumer products;

inspecting said plurality of consumer products for processing defects;

recording production quantity data and processing defect data for each of said plurality of consumer products using a computer terminal, wherein said processing defect data includes a consumer product identification number, wherein said computer terminal and said database are connected to network, whereby said production quantity data and said processing defect data are accessible through said network;

storing said production quantity data an said processing defect data on a database, determining a rate of production based upon said production quantity data; and accessing said database through said network using an auxiliary computer.

2. The method for monitoring assembly plant production quantity and quality of a consumer product as recited in claim 1, wherein the step of processing a plurality of consumer products comprises painting a plurality of consumer products.

3. The method for monitoring assembly plant production quantity and quality of a consumer product as recited in claim 1, wherein said consumer products are vehicles.

4. The method for monitoring assembly plant production quantity and quality of a consumer product as recited in claim 1, wherein said processing defect data also includes a processing defect location.

5. The method for monitoring assembly plant production quantity and quality of a consumer product as recited in claim 1, wherein the step of recording production quantity data and processing defect data comprises entering said production quantity data and processing defect data using a touch screen.

6. The method for monitoring assembly plant production quantity and quality of a consumer product as recited in claim 5, wherein said touch screen includes a computer generated template of multiple views of a vehicle, whereby a location of said processing defect on each consumer product can be recorded.

7. The method for monitoring assembly plant production quantity and quality of a consumer product as recited in claim 1, wherein said network is an internet connection.

8. The method for monitoring assembly plant production quantity and quality of a consumer product as recited in claim 1, wherein said network is an intranet connection.

9. A method for monitoring assembly plant production quantity and quality of a consumer product comprising the steps of:

processing a plurality of consumer products;

inspecting said plurality of consumer products for processing defects;

recording production quantity data and processing defect data for each of said plurality of consumer products using a computer terminal, wherein said processing defect data includes a consumer product identification number; and storing said production quantity data and said processing defect data on a database; and determining a rate of production based upon said production quantity data.

10. The method for monitoring assembly plant production quantity and quality of a consumer product as recited in claim 9 further comprising the step of determining a time for production based upon said rate of production.

11. A method for monitoring assembly plant production quantity and quality of a consumer product comprising the steps of:

processing a plurality of consumer products;

inspecting said plurality of consumer products for processing defects;

recording production quantity data and processing defect data for each of said plurality of consumer products using a touch screen, said touch screen comprising a computer generated template of multiple views of a vehicle, whereby a location of said processing defect on each consumer product can be recorded, wherein said processing defect data includes a consumer product identification number;

storing said production quantity data and said processing defect data on a database coupled to a network, whereby said database is accessible through said network;

accessing said database through said network using an auxiliary computer;

determining a rate of production based upon said production quantity data, whereby a time of production is generated based upon said rate of production;

tracking trends based upon said processing defect data, whereby a corrective action is generated based upon said trends.

12. A method for monitoring paint shop production quantity and quality of a consumer product comprising the steps of:

painting a plurality of vehicle;

inspecting said plurality of vehicles for paint defects;

recording production quantity data and processing defect data for each of said plurality of vehicles using a touch screen, said touch screen comprising a computer generated template of multiple views of said vehicle, whereby a location of said paint defect on each vehicle can be recorded, wherein said processing defect data includes a vehicle identification number;

storing said production quantity data and said processing defect data on a database coupled to an intranet connection, whereby said database is accessible through said intranet;

accessing said database through said intranet using an auxiliary computer;

determining a rate of production based upon said production quantity data, whereby a time of production is generated based upon said rate of production; and tracking trends based upon said processing defect data, whereby a corrective action is generated based upon said trends.

* * * * *

UNITED STATES PATENT AND TRADEMARK OFFICE
CERTIFICATE OF CORRECTION

PATENT NO. : 6,826,497 B1  Page 1 of 1
APPLICATION NO. : 09/552387
DATED : November 30, 2004
INVENTOR(S) : Dave Roy Collins It is certified that error appears in the above-identified patent and that said Letters Patent is hereby corrected as shown below:

Claim 1, col. 4, line 12, delete "an" and insert --and--

Signed and Sealed this

Eighteenth Day of March, 2008

JON W. DUDAS
*Director of the United States Patent and Trademark Office*